M. R. HUTCHISON.
SPEED DEVICE AND INDICATOR.
APPLICATION FILED NOV. 8, 1909.
1,068,133.
Patented July 22, 1913.
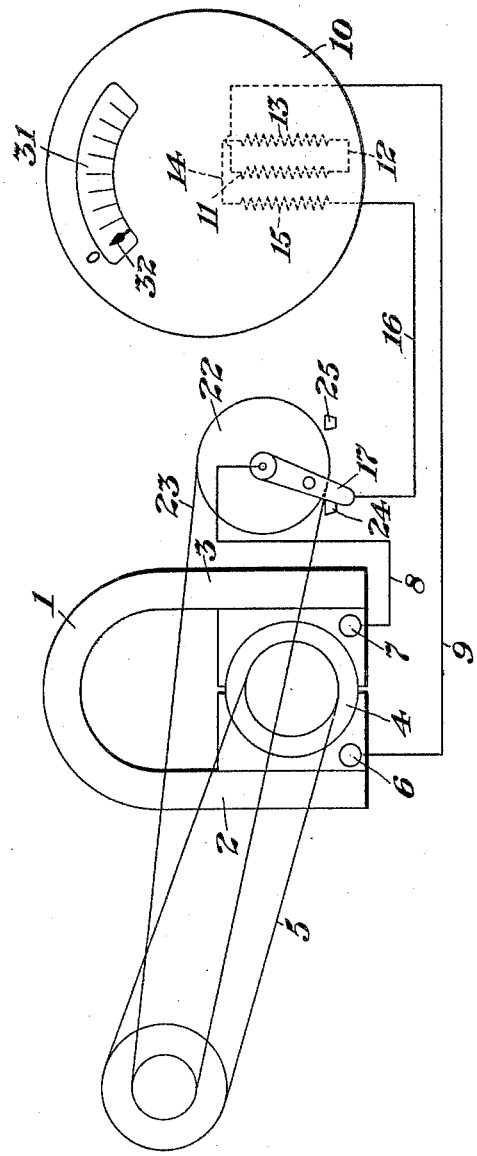
WITNESSES:
INVENTOR
Miller Reese Hutchison
BY
George C. Dean ATTORNEY

UNITED STATES PATENT OFFICE.

MILLER REESE HUTCHISON, OF SUMMIT, NEW JERSEY.

SPEED DEVICE AND INDICATOR.

1,068,133.	Specification of Letters Patent.	Patented July 22, 1913.

Application filed November 8, 1909. Serial No. 526,849.

*To all whom it may concern:*

Be it known that I, MILLER REESE HUTCHISON, a citizen of the United States, and a resident of Summit, in the county of Union and State of New Jersey, have invented certain new and useful Improvements in Speed Devices and Indicators, of which the following is a specification.

My present invention relates to devices of the above type whereby a shaft or other moving body is utilized to cause movement of an indicator or similar device in such manner that a given velocity of movement of the shaft or other driving member will produce given movement of the indicator pointer, the relation being preferably such that the amount of movement of the latter corresponds to the velocity of the movement of the former. It is characteristic of my speed indicator that the movement of the shaft is utilized to generate alternating pressures or currents which are used to actuate any desired instrument capable of responding to the voltage or current, as for instance, an alternating current voltmeter. Such alternating currents or pressures have no directional characteristic whereby currents generated by rotation of the shaft, whose movements are to be indicated, in one direction may be distinguished from those generated by rotation in the other direction, and equal speeds in either direction will always produce equal indications upon a voltmeter or voltage operating device. Hence, for use in places where direction of rotation is important, the directionless alternating current has not been generally used because of the difficulty of ascertaining the direction of such shaft rotation.

While in some instances the operation above described is of slight importance, yet where the rotation of the shaft in one direction tends to undo the work performed by rotation in the opposite direction, and notably in the case of the propeller shaft of a vessel, such an operation of the indicating means is absolutely to be avoided. For example, it is essential that the captain or pilot of a vessel equipped with an indicating device adapted to denote rotation of the propeller shaft to drive the vessel forward, be absolutely assured that any indication given by such device denotes rotation of the shaft for forward movement, and that he be as absolutely assured that no rotation of the shaft for backward movement will cause any forward indication to be given; absence of indication denoting, absolutely, absence of rotation of the shaft for forward movement. Moreover, it is also essential that it be possible to be informed of the presence or absence of forward rotation of the shaft by observation of a single indicating device such as one comprising a single hand, pointer or other indicating means, and that an indication when given may be read and understood without the necessity for calculation based upon such indication. In such a manner all possibility of error and confusion resulting from a false indication of forward shaft movement, or possibility of wrong interpretation of an indication given is absolutely avoided.

My present invention has for its object the provision of certain improvements whereby such alternating voltages or currents operating to actuate indicating means upon rotation of a reversible shaft in one direction, will be automatically cut out upon reversal of the direction of rotation of the shaft so as to prevent indication of forward speeds after reversal.

The above described principles of my invention and the manner in which they may be embodied in speed indicators will be more fully understood from a detailed description thereof in connection with the accompanying drawing, in which like characters of reference denoting like parts are applied as in the corresponding figure of the drawings of my co-pending application No. 450,059 filed August 24, 1908.

The figure is a diagrammatic view showing a manner in which my invention may be practised.

In the drawing I have shown an embodiment of my invention as shown in Figure 1 of the drawings of application No. 450,059, with the exception that the duplicate or alternative field coils and their leads adapted to operate to indicate reversal of the shaft movement are omitted, the device being adapted to cut out the voltage or current upon reversal of the shaft. The apparatus comprises the alternating current generator, means for driving it from the shaft, the speed of which is to be measured, an electrical translating device adapted to respond to changes of voltage in the generator, and a cut-out or switch for automatically cutting out the current to prevent the giving of a forward indication when the driving shaft is reversed.

The constant magnetic field of the generator is indicated by the permanent magnet 1 having pole pieces 2, 3 arranged closely adjacent an inductor 4 consisting essentially of two segmental magnetic screens driven in any suitable manner, as by chain 5 connected directly to the shaft whose movements are to be indicated. The rotation of the inductor 4 distorts the magnetic field, displacing lines of force and causing them to cut the winding of stationary coils, thereby generating alternating voltages therein. These coils constituting a stationary armature are connected through good electrical contacts at 6, 7 with the circuit leads 8, 9. The rate or extent of displacement of magnetic lines and the corresponding voltages of the alternating current impressed upon 8 and 9 are proportional to the speed of rotation of the inductor 4 throughout a considerable range of speed, and it is within this range of proportional variation that the apparatus is used to produce its indications. To this end the ratio of the gearing of 5 from the main shaft to the inductor is such that the lowest useful speed of the drive shaft will cause a rotation of the inductor at a speed sufficiently high to be above the lower limit of this range of proportional voltage change.

The alternating voltages are applied to any alternating current translating device adapted to produce effects proportional to the applied voltage, as, for instance, a voltmeter with a single zero limit scale 31 and indicating hand or pointer 32. The effect, as, for instance, the extent of movement of the index of the voltmeter may be calibrated so as to give direct readings of the revolutions per minute of the driving shaft or direct reading of any movements of any driving or driven part whose movements are a function of or are proportional to such revolutions per minute.

In the drawings the electrical relations which may be utilized to produce the indications are diagrammatically shown in broken lines at 10. The voltage and currents impressed through connection 6 and circuit lead 9 traverse coil 11, thence through conductor 12, coil 13, conductor 14, coil 15, conductor 16, switch 17, and then through return 8 to the armature connection at 7. The coils 13, 15 are preferably utilized as stationary field coils, whereas the coil 11 is acted on inductively by said field coils and its movements are utilized in any connection or desired way to produce a desired effect or indication. It will be noted that whatever movement, either of attraction or of repulsion, is imparted to the coil 11 by the inductive effect of the current in 13 and 15 by currents in one direction, will also be produced by currents in the reverse direction, because said coils are serially connected and reversal of current in one necessarily involves the reversal of current in the other, so that the relative directions of the currents are unchanged. It will also be noted that the movement of 11 in response to any current, being always in the same direction with respect to coils 13, 15 regardless of the polarity of current, will fail to indicate a reversal of rotation of the propeller shaft, though such reversal would operate to reverse the inductor 4. The observer would see that the propeller had stopped and started, but would not know the direction of either movement. In order, therefore, that the indicator may be operated to give an indication for forward rotation of the shaft, and that operation to give a forward indication may be prevented when the shaft is reversed, I provide means for cutting out the current or voltage to the indicator upon reversal of the shaft. A simple arrangement is shown wherein a switch is operated by a pulley 22 geared or belted as at 23 so as to reverse its direction of rotation when the propeller shaft or other driving shaft reverses. Rotation of the pulley 22 in one direction, say clock-wise, carries the switch arm 17 toward the left until it brings up against stop 24. Some form of slip connection then permits 17 to remain stationary as long as the main shaft rotates in this direction. The belt 23 may slip, or, if desired, either pulley 22 or switch arm 17 may be frictionally mounted so that the slip may be at either of these points. When the propeller shaft reverses, the pulley 22 is driven in the opposite direction and the switch arm is carried therewith until it brings up against stop 25, the current or voltage to the indicator being thus cut out.

While I have herein fully shown and described and have pointed out in the appended claims certain novel features of construction, arrangement and operation which characterize my invention, it will be understood by those skilled in the art that various omissions, substitutions and changes in the forms, proportions, sizes and details of the device and of its operation may be made without departing from the spirit of my invention.

I claim—

1. A reversible power shaft in combination with means for generating electrical pressures of alternating direction, connections from the shaft to said generating means for causing said generating means to be driven at speeds varying in definite ratio with the speeds of the power shaft, a voltage operated indicator having a movable member and a scale calibrated to give indications proportional to speeds of said power shaft in one direction by deflection of said movable member, connections from said generating means to said indicator, and means adapted automatically to operate to break the circuit to the indicator for preventing false indications of speed in said direction by the movable member when the direction of rotation of the power shaft is reversed.

2. A reversible power shaft in combination with means for generating electrical pressures of alternating direction, connections from the shaft to said generating means for causing said generating means to be driven at speeds varying in definite ratio with the speeds of the power shaft, a voltage operated indicator having a movable member and a scale calibrated to give indications proportional to speeds of said power shaft in one direction by deflection of said movable member, connections from said generating means to said indicator, and means for preventing false indications of speeds in said direction by the movable member when the direction of rotation of the power shaft is reversed, said last mentioned means comprising a movable switch member automatically operated upon reversal of direction of drive of the power shaft.

3. A reversible power shaft in combination with means for generating electrical pressures of alternating direction, connections from the shaft to said generating means for causing said generating means to be driven at speeds varying in definite ratio with the speeds of the power shaft, a voltage operated indicator having a movable member and a scale calibrated to give indications proportional to speeds of said power shaft in one direction by deflection of said movable member, connections from said generating means to said indicator, and means for preventing false indications of speeds in said direction by the movable member when the direction of rotation of the power shaft is reversed, said last mentioned means comprising a movable switch member adapted to break the circuit to the indicator, and means for automatically operating said switch upon the reversal of the shaft.

4. A reversible power shaft in combination with means for generating electrical pressures of alternating direction, connections from the shaft to said generating means for causing said generating means to be driven at speeds varying in definite ratio with the speeds of the power shaft, a voltage operated indicator having a movable member and a scale calibrated to give indications proportional to speeds of said power shaft in one direction by deflection of said movable member, connections from said generating means to said indicator, and means for rendering said indicator operative upon movement of the power shaft in said one direction and for preventing false indications of speeds in said direction by the movable member when the direction of the rotation of the power shaft is reversed, said last mentioned means comprising a movable switch member automatically operated upon reversal of direction of drive of the power shaft.

5. A reversible power shaft in combination with means for generating electrical pressures of alternating direction, connections from the shaft to said generating means for causing said generating means to be driven at speeds varying in definite ratio with the speeds of the power shaft, a voltage operated indicator having a movable member and a scale calibrated to give indications proportional to speeds of said power shaft in one direction by deflection of said movable member, connections from said generating means to said indicator, and means for rendering said indicator operative upon movement of the power shaft in said one direction and for preventing false indications of speeds in said direction by the movable member when the direction of the rotation of the power shaft is reversed, said last mentioned means comprising a movable switch member which controls and operates to break the circuit to the indicator upon the reversal of the shaft, and means for automatically effecting the operation of said switch member upon such reversal of the shaft.

6. A reversible power shaft in combination with means for generating electrical pressures of alternating direction, connections from the shaft to said generating means for causing said generating means to be driven at speeds varying in definite ratio with the speeds of the power shaft, a voltage operated indicator having a movable member and a scale calibrated to give indications proportional to speeds of said power shaft in one direction by deflection of said movable member, connections from said generating means to said indicator, and means for rendering said indicator operative upon movement of the power shaft in said one direction and for preventing false indications of speeds in said direction by the movable member when the direction of the rotation of the power shaft is reversed, said last mentioned means comprising a movable switch member which controls and operates to complete the circuit to the indicator upon rotation of the shaft in said one direction and to break the circuit to the indicator upon the reversal of the shaft, and means for automatically effecting the operation of said switch member upon such reversal of the shaft.

Signed at New York city, in the county of New York and State of New York, this 5th day of November A. D., 1909.

MILLER REESE HUTCHISON.

Witnesses:
GEORGE C. DEAN,
IRVING M. OBRIEGHT.

Copies of this patent may be obtained for five cents each, by addressing the "Commissioner of Patents, Washington, D. C."